Nov. 17, 1953

N. B. MURPHY 2,659,554

AUTOMATIC STEERING SYSTEM

Filed Feb. 1, 1946

INVENTOR
NORMAN B. MURPHY
BY
ATTORNEY

Nov. 17, 1953  N. B. MURPHY  2,659,554
AUTOMATIC STEERING SYSTEM
Filed Feb. 1, 1946  3 Sheets-Sheet 2
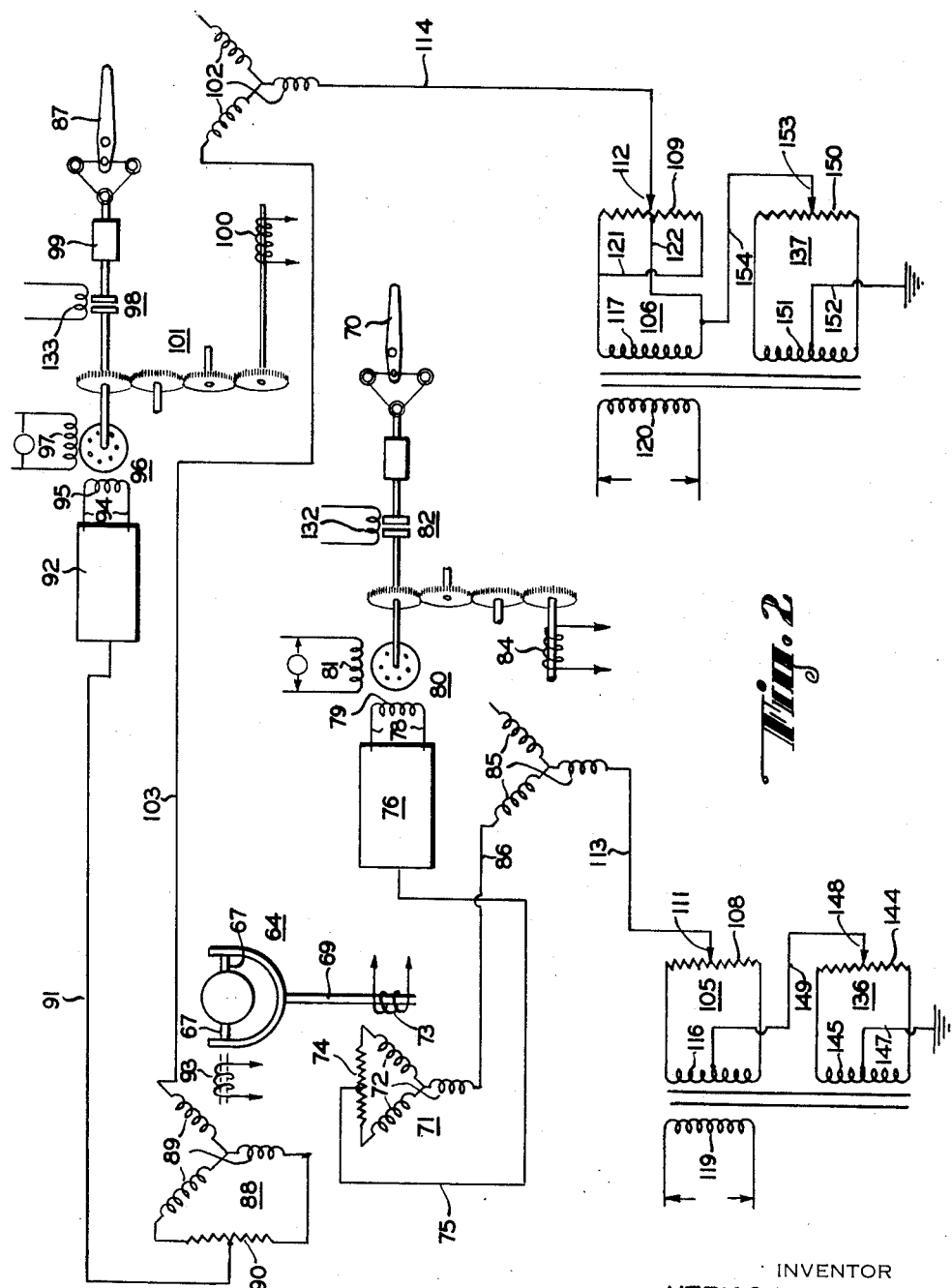
Fig. 2
INVENTOR
NORMAN B. MURPHY
BY
ATTORNEY

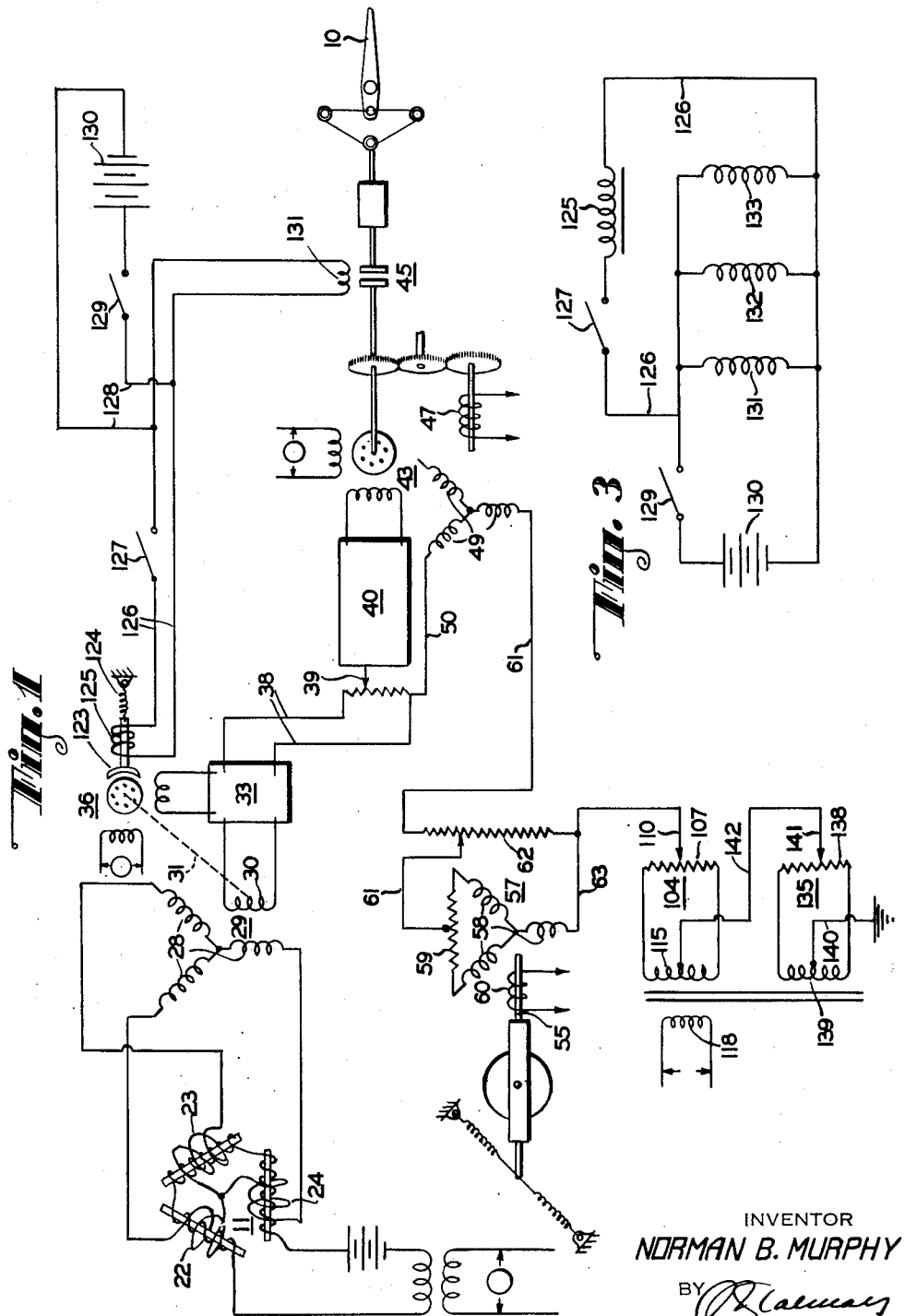

Patented Nov. 17, 1953

2,659,554

UNITED STATES PATENT OFFICE 2,659,554

AUTOMATIC STEERING SYSTEM

Norman B. Murphy, West Englewood, N. J., assignor to Bendix Aviation Corporation, Teterboro, N. J., a corporation of Delaware Application February 1, 1946, Serial No. 644,799

6 Claims. (Cl. 244—77)

1

The present invention relates generally to automatic pilot or control systems for mobile craft or the like having novel provisions therefor for imparting an automatic turn to the craft in the manner more fully described and claimed in copending application Serial No. 644,642, filed January 31, 1946, and now matured into U. S. Patent Serial No. 2,589,834, issued March 18, 1952, to A. M. MacCallum, and more particularly to a novel control unit for initiating and controlling such turn.

Where application Serial No. 644,642, now U. S. Patent 2,589,834, deals with the system as a whole for maneuvering a craft into an automatic turn without calling upon the master instruments to initiate the turn thus leaving the latter free to respond to only those functions of normal course change, rate of course change and attitude change for which they were designed, the present application deals with the novel control unit for the system and the arrangement of instruments thereat for initiating and controlling a desired turn independently of the master instruments.

An object of the present invention, therefore, is to provide an automatic steering system for mobile craft with a novel automatic turn mechanism.

Another object of the invention is to provide a novel automatic turn unit for an automatic pilot or steering system whereby correctly banked turns at any desired rate may be automatically attained.

A further object of the invention is to provide a small, compact and novel control unit for an automatic pilot embodying a novel automatic turn mechanism therein of the character described for controlling the direction and attitude of a craft, the unit being provided with pitch and bank trim knobs for readily trimming elevator and aileron surfaces as required during a linear flight. By manipulation of the pitch trim knob, for example, the craft may be made to climb or dive and will continue to climb or dive at an angle corresponding to the setting of the pitch trim knob until the latter is returned to a central position. Moreover, a single turn control knob is provided on the unit whereby the craft may be made to turn at any desired rate, the correct angle of bank for that turn as well as the necessary amount of elevator trim for that turn being simultaneously introduced upon operation of the turn control knob.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not designed as a definition of the limits of the invention.

In the drawings wherein like reference characters refer to like parts throughout the several views, Figure 1 is a diagrammatic illustration of the rudder control system of the novel light-weight automatic pilot of copending application Serial No. 644,642, now U. S. Patent Serial No. 2,589,834;

Figure 2 is a view similar to that of Figure 1 illustrating the aileron and elevator control systems of the automatic pilot of the aforementioned copending application;

Figure 3 is a detailed view showing the motor control and clutch control wiring hook-up of the system of Figures 1 and 2;

Figure 4 is a perspective view of the novel control unit of the present invention; and Figure 5 is a diagrammatic illustration of the arrangement of the various controls and their electrical connections of the unit of Figure 4.

Figure 1:
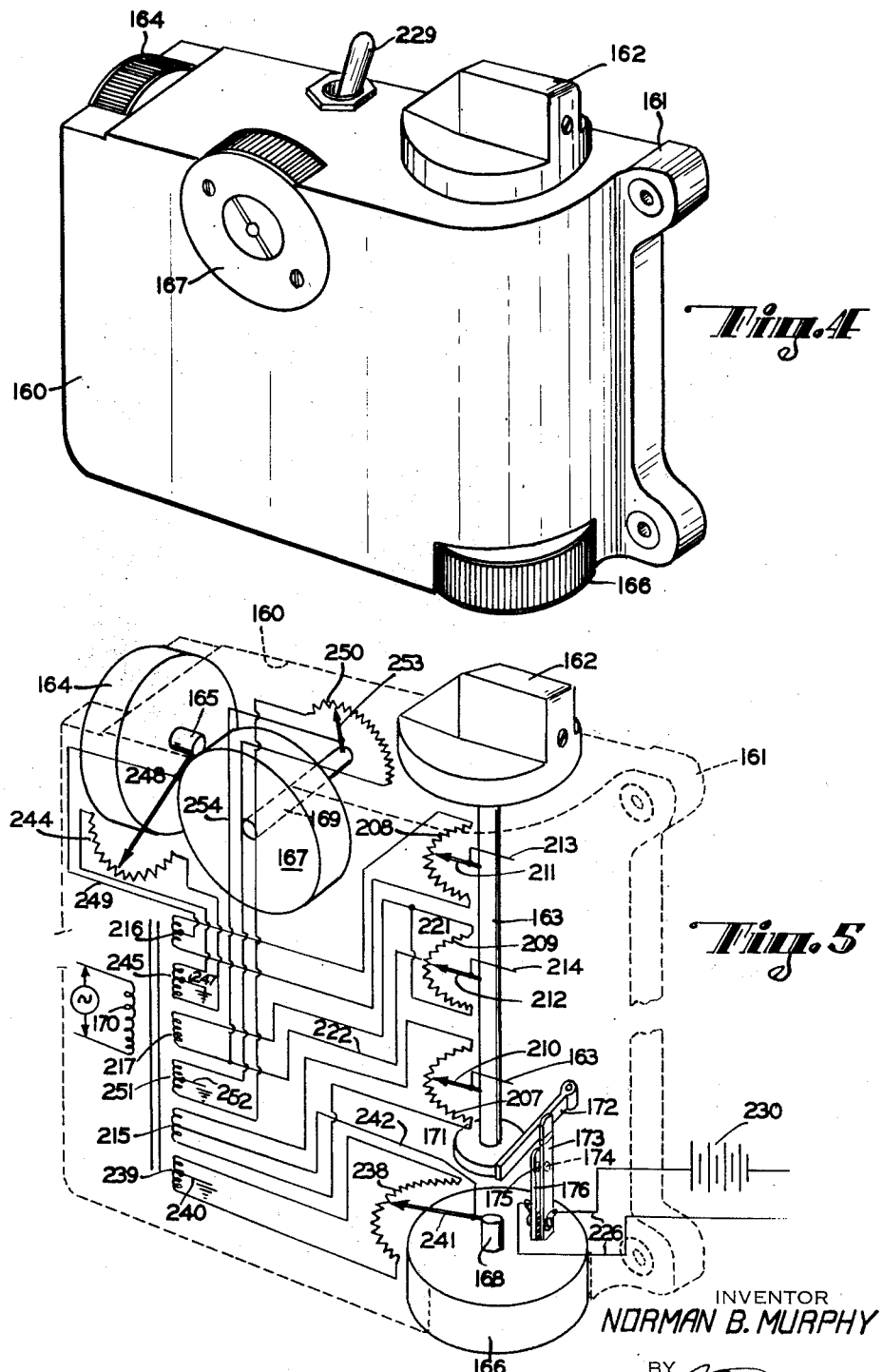

Referring now to the drawings and more particularly to Figure 1 thereof for a more detailed description of the present invention, the mechanism for actuating a rudder control surface 10 comprises a magnetic pick-up unit, generally designated with the reference character 11, which may be of the character shown in copending application Ser. No. 624,710, filed October 26, 1945, and which is rigidly fastened directly to some part of the craft such as the wing, for example, where a minimum of disturbances due to local magnetic fields exists. The pick-up device operates as an earth inductor compass in that for every craft deviation from a prescribed course, however small, the induced voltages at its secondaries 22, 23 and 24 will vary in accordance with and be proportional to the deviation and such variation will be communicated to stator windings 28 of an inductive coupling device 29. A signal will be induced in rotor 30 of device 29 which is amplified within amplifier 33 for energizing an induction motor 36, which is mechanically connected with rotor 30 by way of a shaft 31 for driving the rotor to a null position in which the induced signal will drop to zero.

As will hereinafter more fully appear, motor 36 is locked against rotation during automatic flight so that a signal developed by pick-up device 11 as a result of a deviation from a prescribed course will be reproduced within rotor winding 30, and since the latter cannot be driven to a null by the motor, the signal thereof is communicated by leads 38 and 39 to the input of a conventional vacuum tube amplifier 40, the output of which energizes a two-phase induction motor 43 for displacing rudder 10 through an electro-magnetic clutch 45. On operating, motor 43 also displaces an electrical follow-up device 47, 49 for developing a follow-up signal which is impressed by way of lead 50 on the compass signal at the input of amplifier 40.

In addition to displacement and follow-up signals, motor 43 is also controlled by a signal proportional to the rate of craft turn. To this end an inductive transmitter device 57 is provided comprising three-phase wound stator 58, two phases of which are interconnected through a resistor 59, and a wound rotor 60 connected with a suitable source of current and inductively coupled with the stator. Rotor 60, further, is mounted on a trunnion 55 of a two degree of freedom gyro for motion therewith. Stator 58 has a voltage generated in each of its windings proportional, respectively, to the angular position of each of the windings relative to rotor 60 and the signal resulting therefrom is communicated by lead 61, which connects stator 58 in series with the stator of the follow-up signal generating device, to be impressed upon the direction and follow-up signals at the amplifier input. A resistor 62 interposed between a lead 63 and lead 61 is provided so that an initial setting of the amount of rate signal to be fed into the rudder channel may be predetermined.

Signals for the control of the craft about the bank and pitch axes are derived from take-offs associated with an artificial horizon gyro, generally designated in Figure 2 with the reference character 64, whereby magnetic pick-up device 11 is stabilized in attitude, i. e., maintained in a substantially horizontal plane. To this end, inductive bank and pitch signal transmitter devices 71 and 88 are provided on gyro 64. Bank transmitter device 71 comprises a wound stator 72 and an inductively coupled rotor winding 73 carried by gyro trunnions 69 for angular motion therewith. The rotor winding is connected to a suitable source of current while two of the stator windings are interconnected by a resistor 74 which is center tapped by a lead 75 connecting the stator with the input of the aileron channel of an amplifier 76. For a no-bank condition, the normal position of rotor winding 73 relative to its stator is such that its electrical axis is perpendicular to the stator windings and no signal is induced in the rotor winding. Upon a craft bank, rotor winding 73 moves angularly with trunnions 69 relative to the stator windings to thereby induce a signal in the latter proportional to the amount of craft bank which is amplified within amplifier 76 and supplied at the output thereof by leads 78 to energize the variable phase 79 of a two phase servo motor 80, the second phase 81 of which is continuously energized from a suitable source of current. Motor 80 displaces aileron surface 70 through an electro-magnetic clutch 82 and in so doing also displaces an electrical follow-up device 84, 85, connected in series with stator 72, to develop a follow-up signal which is impressed by way of a lead 86 on the bank signal communicated to the input of amplifier 76.

For the purpose of actuating elevator surfaces 87 to thereby control the craft about its transverse axis and thus also stabilize magnetic pick-up device 11, pitch inductive transmitter device 88 comprises a fixed wound stator 89, two windings of which are interconnected by a resistor 90, the latter being center tapped by a lead 91 which connects the stator with the input of a vacuum tube amplifier 92, and a rotor winding 93 inductively coupled with the stator and connected with a suitable source of current, the rotor winding being carried by trunnion 67 of vertical gyro 64. Normally the rotor winding assumes a position relative to its stator in which its electrical axis is normal to the stator and no signal is induced in the latter. With craft pitch, however, relative motion is developed by the stator 89 and rotor 93 and a signal is induced in the stator proportional to craft climb or descent.

The signal so developed within stator 89 is amplified within amplifier 92 and supplied at the output thereof by leads 94 to the variable phase 95 of a two phase servomotor 96, the second phase 97 of which is continuously energized from a suitable source.

Upon the energization of variable phase 95, motor 96 drives elevator control surfaces 87 through an electromagnetic clutch 98 and a speed reduction gearing 99. Operation of motor 96 causes displacement of a rotor winding 100, which is connected with a suitable source of current, through a speed reduction gear system 101, the winding being displaced relative to its wound stator 102 whereby a signal is induced in the latter and fed by way of a conductor 103 to the input of amplifier 92, the wound stators 89 and 102 being connected in series with each other and the amplifier input. Wound stator 102 and rotor winding 100 constitute an inductive follow-up device which develops a follow-up signal with each craft deviation about its transverse axis, the signal being added algebraically to the pitch signal for elevator control.

The system thus far described constitutes an all electric automatic steering system providing three axes of control, i. e., with a given course and attitude established manually a subsequent engagement of the system will automatically maintain the craft on that course and in that attitude. In order to provide the human pilot with a readily accessible control for throwing the craft into an automatic turn, the rudder turn, aileron turn and elevator turn devices 104, 105 and 106, are provided, each constituting a potentiometer having a resistor 107, 108 and 109 and a wiper or contact arm 110, 111 and 112, wiper arm 110 being connected in series by way of a lead 83 with wound stator 58 of the rate inductive device, wound stator 49 of the inductive follow-up device and input of amplifier 40; wiper arm 111 being connected in series by way of a lead 113 with the wound stator 85 of the inductive bank follow-up device, wound stator 72 of the bank inductive transmitter device and the input of amplifier 76, while wiper arm 112 is connected in series by way of a lead 114 with the wound stator 102 of the inductive pitch follow-up device, wound stator 89 of the pitch inductive transmitter device and the input of amplifier 92.

Each potentiometer resistor 107, 108 and 109 is connected across a related secondary winding 115, 116 and 117 of transformers having primary windings 118, 119 and 120 energized from a suitable alternating current source. Normally, wiper contacts 110, 111 and 112 are located at a central point on resistors 107, 108 and 109 so that no signals are transmitted by turn devices 104, 105 and 106 to their respective control channels.

By displacing wiper contacts 110, 111 and 112 relative to their resistors 107, 108 and 109, rudder, aileron and elevator signals are developed independently of the magnetic pick-up device 11, the rate of turn gyro and the pitch and bank take-offs of the gyro vertical to deflect rudder, aileron and elevator surfaces to direct the craft into the degree of turn called for by the setting of the wiper contacts. In the aileron and elevator channels, the signals introduced by the displacement of wiper contacts 111 and 112 relative to their resistors, deflect the aileron and elevator surfaces until the desired craft pitch and bank are attained, whereupon, resulting from the craft attitude change, signals are developed by the bank and pitch take-offs 71 and 88 which will wash out the signals set in by movement of wiper contacts 111 and 112 when the craft attitude set in by movement of the wiper contacts has been attained. Subsequent deviation from the required craft attitude is under the primary control of the gyro bank and pitch take-offs.

Inasmuch as up-elevator is required in the event of either a left or right turn, the pitch turn device 106 differs from the rudder and aileron turn devices 104 and 105 in that secondary winding 117 of the former is connected at one end by way of a lead 121 with the opposite end of resistor 109 while the opposite end of secondary winding 117 is connected with the center of resistor 109 by way of a lead 122. By reason of such an arrangement, motion of wiper contact 112 in either direction from its central point on resistor 109 will provide a signal in one direction only, i. e., an up-elevator signal, as distinguished from the reversing signal introduced by the wiper contact 111 by its movements from one side of its central position to the other side on resistor 108, for example.

During an automatic turn it is necessary to effectively disconnect the magnetic pick-up device 11 from the rudder channel or otherwise any attempted craft turn would be nullified by device 11, the latter acting to maintain the craft on its previously prescribed course. To this end, motor 36 which normally drives rotor 30 of the inductive coupling device 29 to its null position is provided with an electromagnetic brake in the form of a plunger 123 which is maintained by a spring 124 out of engagement with the rotor of the motor. The plunger is inductively associated with a coil 125 which connects through leads 126, a turn switch 127, leads 128 and a clutch switch 129 with a battery 130. Also connected, as partly shown in Figure 3, for energization by the closure of clutch switch 129 are coils 131, 132 and 133 for engaging clutches 45, 82 and 98 whereby rudder servomotor 43 is driveably engaged with rudder surface 10, aileron servomotor 80 is driveably engaged with aileron surfaces 70 and elevator servomotor 96 is driveably engaged with elevator surfaces 87.

During straight automatic flight, clutch switch 129 is closed to thereby establish a driveable connection between the servomotors and their related control surfaces and turn switch 127 is likewise closed thereby energizing coil 125 so that plunger 123 brakes the rotor of motor 36 against rotation so that any craft deviation in azimuth develops a signal in rotor winding 30 by the operation of the magnetic pick-up device 11 which acts to operate servomotor 43 and thereby actuate rudder surface 10.

With the initiation of an automatic craft turn, i. e., when wiper contacts 110, 111 and 112 are displaced relative to their resistors 107, 108 and 109, turn switch 127 is opened to deenergize coil 125 whereupon spring 124 retracts plunger 123 from engagement with motor 36 so that the latter is free to rotate in response to signals developed within rotor winding 30. Thus, during an automatic turn, even though magnetic pick-up device 11 is constantly developing a signal proportional to the amount of craft displacement in azimuth which signal is reproduced within rotor winding 30, the motor 36 being free to turn, drives rotor 30 to its null so that no displacement signal is available from pick-up device 11 for the rudder channel during such a turn.

By providing an arrangement whereby motor 36 is locked against rotation during straight automatic flight and is unlocked for rotation and operation during manual flight or during an automatic turn, a novel synchronization feature is presented whereby the system is always in synchronism, i. e., prior to the initiation of straight automatic flight, the rotor winding 30 of the inductive coupling device is at its null position to immediately take over control of the rudder surface. In response to any deviation from a prescribed course, subsequent to pilot engagement, a signal is developed within winding 30 proportional to the deviation and since motor 36 is braked or locked and cannot drive winding 30 to its null, the signal is communicated from winding 30 to operate servomotor 43.

During straight automatic flight, switches 127 and 129 are closed but during an automatic turn switch 127 is opened to free motor 36 for operation. During manual flight, on the other hand, clutch switch 129 is opened to disconnect the servos and permit manual control of the surfaces. At such time, even though turn switch 127 is closed, coil 125 is deenergized, as soon as it connects with battery 30 through the clutch switch, to thereby release motor 36 for operation.

Even though the rudder channel has been shown as provided with an amplifier 33 and aileron and elevator channels with separate amplifiers 76 and 92, it is to be understood that but one amplifier is needed containing all three channels as shown in copending application Serial No. 516,488 filed December 31, 1943.

Under certain conditions it is desired to trim the rudder, aileron and elevator surfaces and to this end novel rudder trim, aileron trim and elevator trim devices 135, 136 and 137 are provided. Rudder trim device 135 comprises a potentiometer having a resistor 138 connected across a secondary winding 139 of the transformer having winding 118 for its primary. A central tap of the secondary winding is grounded by way of a conductor 140 while resistor 138 is provided with a wiper contact 141 which is arranged at a normally central point on resistor 138, wiper 141 being connected by way of a lead 142 with a central portion of secondary winding 115. Thus arranged, rudder trim device 135 is in series with rudder turn device 104, the rate inductive device, the rudder inductive follow-up device and the input of the rudder channel of the amplifier.

Aileron trim device 136 comprises a potentiometer having a resistor 144 connected across a secondary winding 145 of the transformer having winding 119 for its primary. A central tap of the secondary winding is grounded by way of a conductor 147 while resistor 144 is provided with a wiper contact 148 which is arranged at a normally central point on resistor 144, wiper 148 being connected by way of a lead 149 with a central portion of secondary winding 116. As will be apparent, aileron trim device 136 is in series with aileron turn device 105, stator 85 of the bank follow-up device, stator 72 of the bank take-off device and the input of the aileron channel of the amplifier.

Elevator trim device 137, on the other hand, comprises a potentiometer having a resistor 150 connected across a secondary winding 151 of the transformer having winding 120 for its primary. A center tap of the secondary winding is grounded by way of a conductor 152 while resistor 150 is provided with a wiper contact 153 which is arranged at a normally central point on resistor 150, wiper 153 being connected by way of a lead 154 with secondary winding 117 at that end which connects by way of a lead 122 with the center tap of resistor 109 of the pitch turn device 106. Thus arranged, elevator trim device 137 is in series with elevator turn device 106, the stator 102 of the pitch follow-up device, stator 89 of the gyro pitch take-off device and the input of the elevator channel of the amplifier.

If left or right rudder trim is required, wiper arm 141 is displaced relative to resistor 138, above or below the center point thereof, and the required signal is fed by lead 142 into the rudder channel of the amplifier. Similarly for bank or pitch trim, wiper contacts 148 and 153 are displaced relative to their resistors 144 and 150, above or below their normally central position, to feed required bank or pitch trim signals into the aileron and pitch channels of the amplifier.

Coming now to the novel control unit of the present invention and the arrangement thereat of the various components comprising the automatic turn control mechanism hereof, it is shown in Figure 4 as comprising a substantially rectangular casing 160 having an apertured rear flange 161 for attaching the unit to a wall of the craft cockpit for ready access to the human pilot. As shown, casing 160 at its top is provided with an automatic turn knob 162 having a shaft 163 (Figure 5) suitably journalled within the casing and a bank trim knob 164 arranged to the rear of the casing and carrying a shaft 165 arranged transversely to turn shaft 163. In addition, rudder trim and pitch trim knobs 166 and 167 are provided on casing 160, the former being located on the underside of the casing and supporting a shaft 168 and the latter being located at the top side of the casing and carrying a shaft 169 thereon.

For reasons of clarity, the various components are shown diagrammatically within casing 160 and parts in Figure 5 corresponding to like parts illustrated in Figures 1 to 3, inclusive, are designated with the same reference character plus one-hundred. To this end, turn shaft 163 carries suitably insulated therefrom bank turn wiper contact 211, pitch turn wiper contact 212 and rudder turn wiper contact 210. Each of the wiper contacts normally engages at a central point with its related resistor 208, 209 and 207, the resistors being shown as arcuate in shape and coaxial with the turn shaft. Resistor 208 connects by suitable leads with its secondary winding 216, resistor 209 connects in the same manner with the secondary winding 217 while resistor 207 connects with its secondary winding 215. Shaft 165 of bank trim knob 164 supports thereon a wiper contact 248 which normally rests on a central point of its resistor 244, the latter being arcuate in shape and connected by way of suitable leads with its secondary winding 245, a center tap of the secondary being grounded by way of a lead 247 while wiper contact 248 connects by way of a lead 249 with a central point of secondary winding 216.

Supported upon shaft 169 of the pitch trim knob 167 is wiper contact 253 which normally rests on a central point of its resistor 250 which is arcuate in shape and which at its outer ends connects by suitable leads with its secondary winding 251, a center tap of said secondary being grounded by way of a lead 252 while wiper contact 253 connects by way of a lead 254 with one end of secondary winding 217, such end of the secondary being connected with a center point of resistor 209 by way of a conductor 222 while the opposite end of secondary 217 connects with an opposite end of resistor 209 by way of a lead 221.

Rudder trim knob 166 supports on its shaft 168 a wiper contact 241 which normally rests on a central point of its resistor 238 which is arcuate in shape and which at its outer ends connects by suitable leads with its secondary winding 239, a center tap of such secondary being grounded by way of a lead 240 while wiper contact 241 connects by way of a lead 242 with a central point of secondary winding 215. Although separate primary transformer windings 118, 119 and 120 have been shown in Figures 1 and 2, it is to be understood that but a single transformer primary 170 within the controller unit is required.

The outer extremity of turn shaft 163 is provided with a cam 171 having a flat side normally engaging a pivoted leaf arm 172 which rests against and is insulated from a resilient arm 173 carrying thereon a contact 174 in engagement with a contact 175 carried by a fixed arm 176, the two contact arms being suitably insulated from each other. Contact 174 is connected by way of a lead 226 with battery 230 and contact 175 is connected by way of a similar lead 226 with a coil corresponding to coil 125 of Figure 1. Contacts 174—175 thus define the turn switch 127 of Figure 1 which is normally closed to energize coil 125 and brake or lock motor 36 against operation. With the setting of turn knob 162, however, cam 171 breaks contacts 174—175 to open the switch and release motor 36 for operation. In addition, the controller unit is provided with a clutch switch 229 (Figure 4) which corresponds to clutch switch 129 of Figure 1.

For trimming rudder or aileron, the human pilot turns knobs 166 or 164 in one direction or another from their normally central position on resistors 238 or 244 whereupon a direction or bank signal is introduced into the rudder or aileron channel of the amplifier as heretofore described to actuate rudder or aileron surfaces to obtain the desired rudder or aileron trim.

With the automatic pilot engaged, the craft may be forced into a climb by operating pitch trim knob 167 to displace wiper arm 253 from its normally central position in one direction related to its resistor 250 whereby a signal is developed and fed into the elevator channel of the amplifier to deflect the elevator surfaces and cause the craft to climb and it will be maintained in such climb until knob 167 is returned to neutral, i. e., a position where wiper contact 253 is brought to engage resistor 250 at the central point thereof. To bring the craft into a dive, knob 167 is operated to displace wiper arm 253 in an opposite direction relative to resistor 250.

If, during the course of linear flight with the automatic pilot engaged, it is desired to change course, the human pilot need merely displace turn knob 162 an angular amount proportional to the rate of turn desired. Displacement of knob 162 actuates cam 171 to open contacts 174—175 (switch 127 of Figure 1) to unlock motor 36 for operation whereby rotor winding 30 is constantly driven to a null and no signal from the magnetic pick-up device 11 is fed into the rudder during the turn. Displacement of knob 162, furthermore, results in displacement of wiper contacts 211, 212 and 210 to feed proper signals into the aileron, elevator and rudder channels, an up-elevator being called for in each instance notwithstanding the direction of turn.

By the operation of turn control knob 162 the conditions for a desired turn are automatically established without loading or calling upon the rate gyro or the artificial horizon gyro to initiate the turn. The signals set in by the turn knob are fed into their respective networks to control related surfaces to swing the craft into a desired turn at the current angle of bank for that turn together with the necessary up-elevator. The theory and operation underlying the control presented by turn knob 162 is generally similar to that underlying the arrangement shown in copending application Serial No. 595,236, now U. S. Patent Serial No. 2,516,796, filed May 22, 1944.

The novel automatic turn control unit above described is of such character that extreme flexibility of control is provided by the automatic pilot which makes it possible to execute maneuvers by turning appropriate controls. For example, sharply banked turns may be made by actuation of turn control knob 162, the craft immediately returning to straight flight when the knob is returned to its central position. Steep climbs or dives may be made by operating pitch trim knob 167. Moreover, a combination of turns and climbs or turns and dives may also be executed or the craft quickly thrown from a correctly banked turn in one direction to a correctly banked turn in an opposite direction.

Although but a single embodiment of the invention has been illustrated and described in detail, it is to be expressly understood that the invention is not limited thereto. Various changes may also be made in the design and arrangement of parts without departing from the spirit and scope of the invention, as the same will now be understood by those skilled in the art. For a definition of the limits of the present invention, reference will be had primarily to the appended claims.

What is claimed is:

1. A turn control unit for the automatic pilot of an aircraft, said automatic pilot having means for maintaining the craft on a predetermined course, means for maintaining the craft in a predetermined bank condition, and means for maintaining the craft in a predetermined pitch attitude, said means for maintaining the craft on a predetermined course including a course change responsive means having a displaceable signal generator, actuating means operatively connected with the latter for displacing said generator to a non-signal generating position, and control means operatively connected with said actuating means which when operated in one manner make the actuating means effective on said generator to displace the latter whereby no signal is available from the course change responsive means for maintaining said craft on a predetermined course and which when operated in another manner make the actuating means ineffective on said generator whereby the signal of the latter operates said course maintaining means to maintain said craft on the predetermined course, said turn control unit comprising displaceable turn, bank and pitch signal generators for controlling said course maintaining means, bank condition maintaining means, and pitch attitude maintaining means, a common member supporting said turn, bank, and pitch signal generators for displacement, a manually operable member operatively connected with said common member for displacing said common member from a reference position to bank and turn the craft, and means operatively connecting said common member with said control means and operative in response to movement of said manually operable member for making the actuating means effective on said first mentioned signal generator.

2. In an automatic pilot for aircraft having rudder, aileron, and elevator surfaces, said automatic pilot having servomotors associated with said surfaces for actuating the same and including course change responsive means operatively connected to the rudder surface servomotor and attitude responsive means operatively connected to the aileron and elevator surface servomotors, said course change responsive means including a displaceable signal generator, actuating means connected to said generator and for displacing the latter to a non-signal generating position, and control means connected with said actuating means which when operated in one manner make the actuating means effective on said generator to displace the latter whereby no signal is available from the course change responsive means for operating said rudder servomotor and which when operated in another manner make the actuating means ineffective on said generator whereby the signal of the latter operates the rudder servomotor, a turn control unit comprising displaceable turn, bank, and pitch signal generators controlling the rudder, aileron, and elevator servomotors, a common and displaceable member supporting said turn, bank, and pitch signal generators in tandem, a manually operable device connected with said common member for displacing it from a reference position to bank and turn the craft, and means operatively connected with said common member and said control means and operative by said manually operable device for making the actuating means effective on said first mentioned signal generator.

3. In an automatic pilot for an aircraft having rudder, aileron, and elevator surfaces, said automatic pilot having servomotors actuating said surfaces and including course change responsive means controlling the rudder surface servomotor and attitude responsive means controlling the aileron and elevator surface servomotors, said course change responsive means having a displaceable signal generator, actuating means operatively connected with said generator for displacing the latter to a non-signal generating position, and control means operatively connected with said actuating means for rendering said actuating means effective and ineffective to displace said generator to develop a signal to control the rudder surface servomotor, a turn control unit comprising turn, bank, and pitch signal developing potentiometers having displaceable contact arms for controlling the rudder, aileron, and elevator surface servomotors, a displaceable member supporting said contact arms, a manually operable member operatively connected with said displaceable member for moving the displaceable member from a reference position to bank and turn the aircraft, and means interconnecting said displaceable member and said control means and operative by said manually operable member for making the actuating means effective on said first mentioned signal generator.

4. In an aircraft automatic pilot having a rudder servomotor and course change responsive means connected to said servomotor for controlling the motor, the course change responsive means including a displaceable signal generator, actuating means associated with said generator for displacing the generator to a non-signal generating position, and control means operatively connected with said actuating means which when operated in one manner effect said actuating means so that no signal is available from the course change responsive means for rudder servomotor control and which when operated in another manner effect said actuating means so that a signal is available to control the rudder servomotor, a turn control means comprising a displaceable turn signal generator for controlling the servomotor, a manually operable control member connected to said turn signal generator for displacing the latter and means operatively connected with said control means and said manually operable member and operable by said manually operable member for affecting the actuating means so that no signal is available from said first signal generator.

5. In an aircraft automatic pilot having a surface displacing motor and position change responsive means connected to said motor for operating the latter, said position change responsive means including a displaceable signal generator, an actuating means operatively connected with said generator for displacing the latter to a non-signal generating position, and control means connected with said actuating means which when operated in one manner make the actuating means effective on said generator to displace the latter whereby no signal is available from the position change responsive means for motor control and which when operated in another manner make the actuating means ineffective on said generator whereby the signal of the latter controls the motor, a turn control means comprising a displaceable position change signal generator for controlling the motor, a manually operable control member operatively connected with said position change signal generator for displacing the latter, and means operatively connected with said control means and said manually operable member and operable by said manually operable member for making the actuating means effective on said first mentioned signal generator.

6. In a plurality of motor control circuits, each circuit comprising a motor and a two-part inductive device operatively connected with said motor and wherein each inductive device has one part movable relative to the other to develop a control signal for said motor and a separate means operatively connected with each of said movable parts for moving the latter, a control unit for said circuits comprising a plurality of impedance units including resistors and coacting wipers, an adjusting means operatively connected with each of said wipers for moving the latter to develop a control signal for a respective motor, a unitary member connected to all of said adjusting means, a manually operable means connected to said unitary member for moving the latter to develop a signal for each of said motors, a means completing each circuit by connecting said impedance device in series with said inductive device to said motor, and means on said unitary member connected with one of said circuits for rendering upon movement of said unitary member from a predetermined position a selected inductive device ineffective to control its associated motor.

NORMAN B. MURPHY.

References Cited in the file of this patent

UNITED STATES PATENTS

| Number | Name | Date |
|---|---|---|
| 1,466,293 | Brooks | Aug. 28, 1923 |
| 1,973,453 | Whiting | Sept. 11, 1934 |
| 2,005,530 | Boykow | June 18, 1935 |
| 2,196,385 | De Florez | Apr. 9, 1940 |
| 2,203,671 | Carlson | June 11, 1940 |
| 2,471,821 | Kutzler et al. | May 31, 1949 |
| 2,516,641 | Murphy | July 25, 1950 |
| 2,516,796 | Noxon et al. | July 25, 1950 |
| 2,589,834 | MacCallum | Mar. 18, 1952 |

OTHER REFERENCES

"Electronics" of October, 1944, pages 110, 111, 112, 113, 114, 115, 116, 117.